United States Patent

Moisescu et al.

[15] 3,640,206
[45] Feb. 8, 1972

[54] PROCESS AND PLANT FOR FAST CONDITIONING OR THERMAL TREATMENT OF BREAD CEREALS, ESPECIALLY WHEAT

[72] Inventors: Gheorghe Moisescu; Valer Stoica; Carol Wolf; Nicolae Spataru, all of Bucharest, Romania

[73] Assignee: Institutul de Cercetari Si Proiectari Alimentare, Bucharest, Romania

[22] Filed: Mar. 28, 1969

[21] Appl. No.: 811,420

[30] Foreign Application Priority Data

Apr. 1, 1968 Romania..................................56296

[52] U.S. Cl..................................................99/237, 99/80
[51] Int. Cl. ..........................................................A23b 9/00
[58] Field of Search......................99/237, 2, 238.7, 234, 53, 99/80, 81, 83

[56] References Cited

UNITED STATES PATENTS

| | | | |
|---|---|---|---|
| 2,278,701 | 4/1942 | Karr | 99/237 R |
| 3,252,406 | 5/1966 | Altman | 99/237 |
| 3,336,137 | 8/1967 | Hickey | 99/2 |
| 3,471,298 | 10/1969 | Hirahara | 99/2 |

*Primary Examiner*—Robert W. Jenkins
*Attorney*—Spencer & Kaye

[57] ABSTRACT

A process for treating cereals including the steps of fast heating the cereals with steam jets, storing the thus-treated cereals while at the same time mixing them, and then cooling and drying using a countercurrent flow of indirectly and intermediately heated air.

A plant for performing the process including in descending vertical order a prismatic bin for holding untreated cereal, a cereal fast heating and storage apparatus, a cooler-drier, and a metering device.

7 Claims, 2 Drawing Figures

PATENTED FEB 8 1972 3,640,206
FIG. 1
FIG. 2
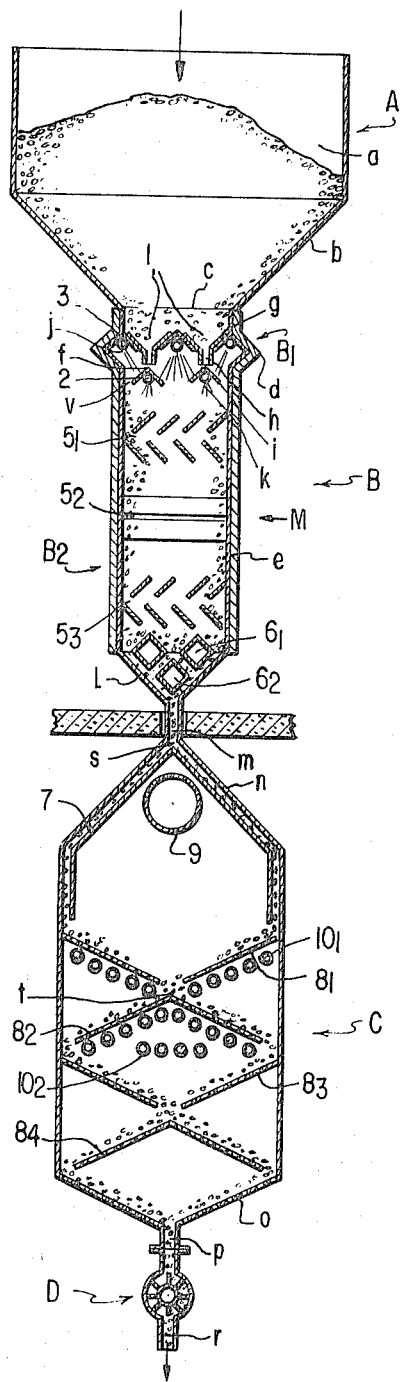
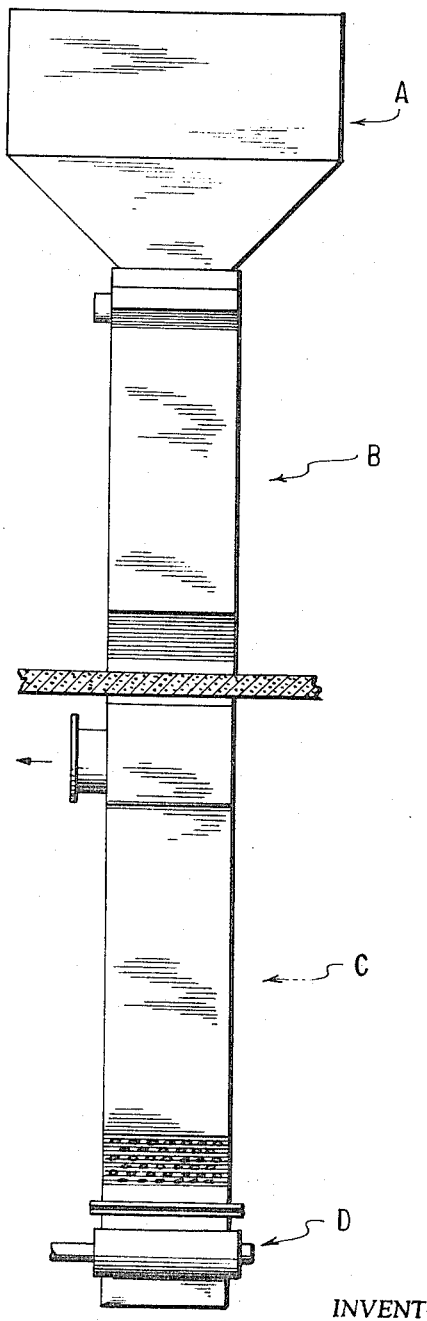
INVENTORS.
GHEORGHE MOISESCU
CAROL WOLF
VALER STOICA
NICOLAE SPATARU
BY Spencer & Kaye
ATTORNEYS.

PROCESS AND PLANT FOR FAST CONDITIONING OR THERMAL TREATMENT OF BREAD CEREALS, ESPECIALLY WHEAT

The present invention relates to a process and a plant for conditioning or thermal treatment of bread cereals, especially of the wheat, to improve milling properties, and qualities important for bread manufacture.

The conditioning of bread cereals is known, especially for wheat, using moisture and heat, followed by cooling, for the purpose of improving milling properties by an increased output of superior quality flour, smaller ash content and a reduced energy consumption. For this conditioning, the cereals are previously moistened in two to three stages, then allowed to undergo a pause period of a total duration of 8 to 15 hours, until reaching a moisture exceeding by about 4 to 5 percent the adequate milling moisture. The heating is then gradually performed, in order to avoid local overheatings, through contact with hot surfaces or by hot air blowing, for a period of 1 to 2 hours, after which follows the cooling, by cold air blowing.

The conditioning operation is performed in vertical columns, in which the cereals flow from top to bottom while being subjected to successive heatings and coolings, until the ultimate cooling.

Wheat conditioning in vertical columns requires a long time, a high heat consumption to remove the moisture, and bulky and expensive plants. The long duration of the treating in continuous flow renders more difficult the control of the operating parameters, which results in great quantities of inadequately treated cereals. Therefore, the thermal conditioning of the bread cereals, in spite of its importance, has not become widespread and even where the conditioning columns do exist, they are operating at overly reduced temperatures, to avoid the cereal degradation risks.

Also known is the treating with moisture and heat, followed by cooling, of the bread cereals, especially wheat, having a bad or very bad gluten, altered by proteolytic enzymes or due to the attack of the wheat bug; this treatment is performed in order to improve the wheat bread manufacture qualities, such as the increase of the gluten index, the meal hydration capacity increase, and a smaller meal specific consumption; the treatment also contributes to improving the milling properties.

It was known for some time that, by an adequate combination of the duration of the treatment, grain moisture content, and temperature, there may be obtained a stronger influencing of the proteolytic enzymes, particularly those existing in the external layers of the aleuronic cells and in the embryon, than of the proteins and amilolytic enzymes, out of the endosperm. For this treatment, various ways have been tried, such as the use of hot air, steam, with alternative heating and cooling, to which other means can be added.

The known experiences of Berliner, effected by microchemical methods, have shown that in the normal cereal crops grain, the enzymes which mainly influence the bread manufacture exclusively are found in the embryon and at the aleuronic cell level, outside of the endosperm. Based on this finding, the possibility of treating these cereals was established so as to affect the proteolytic enzymes exclusively, without influencing, not even partially, the endosperm. A process could thus be established, by laboratory studied, for fast thermal treating of these cereals, which process comprises: their superficial moistening, without water penetrating into the endosperm, followed by the heating at at least 70° C., for a short time; thus, only the aleuronic cells and embryons reach such a temperature, while the endosperm, which remains dry, does not exceed 40° C. The heating is followed by a fast cooling of the cereal, by various ways. The heating may be performed: (a) by hot air, in the 140° C. range, for a maximum of 2 minutes, followed by a cooling, in a lower temperature zone; (b) by steam over the eventually unmoistened cereals, for a period of some seconds, followed by a cooling by any means, for instance by cold air, at the most at 40° C.; (c) by low voltage and low frequency current over the cold water moistened cereals, by thrusting parallel electrodes into, the cereal for a time ranging from some seconds to 1 minute.

This fast thermal treating process attempts to achieve, by the heating, respectively cooling, thermal shock: the normal wheat conditioning, when the heating is performed at lower temperatures; the thermal treatment of the bad or very bad gluten wheat, when the heating is pursued up to higher temperatures, which ensures the proteolytic enzyme activity blocking in the grain peripheral zone, while protecting the amilolytic enzymes in the endosperm central zone.

For the application of this process an apparatus named "Stabilizator" has been suggested, which includes a horizontal worm continuous transporter of cereals settled under their own weight; the worm rotates in a tight steel casing, provided with nozzles; during the transport period, of 50–60 seconds, in the apparatus, the cereals are steam injected, heated and mixed, reaching temperatures of 45° to 65° C. The heated wheat is immediately delivered into a washing machine, where it is suddenly cooled at the temperature of 25° C. For the removal of excess moisture, the wheat is led to a short vertical drying column, named "Viscator," in which it is cooled by hot air, until an appropriate humidity is reached, and is then passed to milling.

The wheat heating, in the Stabilizator apparatus, is performed, without previous moistening, and affects directly only the mass passing right in front of the nozzles zone; the farther part of the mass is indirectly heated, by a short mixing; that is why the treating temperatures do not even exceed 65° C. On the other hand, due to water cooling, the humidity of the cereal considerably increases, the heated grains having an increased capacity for water absorption; that is why the following drying in the Viscator requires a high energy consumption, and a bulky and complicated apparatus. Although such apparatus eliminate the previous drying, its application did not spread.

According to an another method, the previously moistened cereals are fed into the bunker of a vertical plant, wherein they are treated, by batches, with heat and moisture, in three closed apparatuses, separated by valves, and operating under vacuum. In the first apparatus, there takes place the material expansion; in the second one, the cereals are dispersed by falling on a cone's pointed end, in the shape of a thin curtain, while they are subjected to a transverse steam or hot water spray, after which they are left to rest for some time; the cereals are then allowed to flow into the last apparatus, wherein the cooling and vacuum drying takes place, with heat added from hot serpentines. A similar process maintains a constant vacuum, at a value which corresponds to the steam temperature of 50°–70° C. A continuous vertical plant is used with two apparatuses, separated by volumetric dosing devices, with rotor and blades. Through the first apparatus, the cereals flow in the shape of a thin curtain, in a few minutes, under steam penetration, in a range of inlet nozzles; in the second similar apparatus, the cooling-drying is performed, the steam being withdrawn by an external ejector. These processes and plants require great amounts of utilities, develop small productivities, require vacuum equipment and lead to bulky and expensive plants.

The present invention concerns a process and a plant for fast conditioning or thermal treatment of bread cereal crops, especially wheat, without previous moistening, by using a fast steam heating, at an adequate temperature and of adequate duration, followed by air cooling, which process and plant offer an easy operation, a reduced consumption of processing materials, and reduced installation space and investments.

In the process, according to invention, the cereal heating is performed in a heating zone, by saturated steam jets, sprayed from a distance over the relatively settled (under their own weight) cereals, which flow from upper bins, in the shape of parallel, thin and sloping cereal blades of a thickness adjustable so as to be penetrated by the jets. The steam jet heating further possibly continues over a somewhat horizontal thin layer of settled cereals, after having been heated in their flow as sloping blades.

The heating uses saturated steam of low pressure during 3 to 6 seconds; the consumed steam is absorbed from the cereals, as supplementary humidity.

It has been established that the saturated steam heating by jets sprayed from a distance over the wheat settled in blades or layers is sufficiently uniform and offers full security against local overheatings; it leads to an adequate moistening of the husk and of the outer layers, simultaneously with the achievement of a well-marked and corresponding thermal shock; the heating is fast, easily adjustable and involves only the husk, the outer layers with the aleuronic cells and the embryon; the heating is performed at the temperatures known as necessary, of 45°–55° C., in the case of the conditioning and at least 70° C., in the case of cereal thermal treatment. The total moisture, taken from the absorbed steam, is 2–3 percent for conditioning and 3–4 percent for cereal thermal treatment.

The heating of cereals, in the shape of settled and thin blades, possibly also as a layer, is followed by a short storing of same. This is effected in a storage zone, the cereal being equally in settled condition and in continuous flow. Mixing is also performed here, both for the purpose of more advanced homogenization and for that of grain residence time equalization.

In their further flow, the cereals reach by falling a fast cooling-drying mixing zone. These processes are carried out on the flowing cereals, in relatively thin layers, and by mixing the slightly loose mass, by bathing it in cooling air drawn from the outside; the air flows countercurrent to the cereals. In spite of the fast cooling achieved, the air remains relatively cool, due to the concomitant grain drying process; the air must be intermediately heated, to bring it back to the relative humidity adequate for drying the cereal down to the moisture appropriate for grinding.

It has been established, that the cool air cereal cooling-drying under the described conditions, down to a temperature below 40° C. and to the humidity adequate for grinding, is performed in a time of 2–3 minutes, with a consumption of about 400–500 m.$^3$ air/$t$ cereal and of 4–5 kg. steam/$t$ cereal for intermediate heating of the air. The cooling thermal shock, realized under these conditions, has been confirmed as satisfactory. The specific steam consumptions are obviously smaller for conditioning, than for cereal thermal treatment.

The continuous plant for fast conditioning or thermal treatment of cereals according to the described process consists of many individual apparatuses assembled in a vertical line; listed from top to bottom, the respective combination comprises the apparatuses described below:

a. A prismatic bin, the bottom of which is a pyramid frustum, and in which a cereal buffer mass is maintained. From this mass the plant is supplied; for uniformity of feeding, the cereal level in the prismatic body is maintained at an adjusted level, between two limits.

b. A cereal fast heating and storage apparatus, containing cereal in continuous flow. This apparatus is prismatic, its mouth is directly assembled to the prismatic bin, and it is thermally insulated at the outside to maintain the necessary heat. At its upper part, the apparatus comprises a heating zone, with steam jets from nozzles spaced from the cereal, and with means for dividing the cereal flow, relatively settled, in parallel, thin and sloping blades, of a variable thickness, eventually even for maintaining a somewhat horizontal, settled cereal layer to be heated by means of other steam jets. The heating zone is followed by a cereal storage zone, with means for mixing; these means carry out a more advanced homogenization, provide grain residence time equalization, and fight against the suction effect, due to following apparatus, under item (c).

As means for dividing the settled cereal flow in parallel thin and sloping blades, and for preserving a somewhat horizontal settled cereals level, the apparatus contains first, a number of internal microbins, which partition the cross section of the apparatus, at the upper end assembled to the prismatic bin. These microbins are prismatic, their bottom being constituted of two planes sloping, one towards the other, and an outlet through a narrow-rectangular slit, whose depth extends over the whole depth of the cross section of the upper end assembled to the prismatic bin. Secondly, the means comprise two planes each, sloping one towards the other preferably at 45°, joined by a horizontal common edge, for each of the outlet slits mentioned above, the edges being parallel to the slits. Along these planes run, in equal, relatively settled blades, the cereals fed through each of the said narrow slits. The cereal blades are injected with steam jetted somewhat transversely to the blades. The steam jets are provided from the relatively remote nozzles of some pipes that do not touch the cereals. Somewhat lower than the first nozzles namely below the common edges of said planes sloping at 45°—there are provided some other nozzle pipes for forming steam jets, which jets may heat, in case of need, the rather horizontal and superficial top layer of settled cereals in the flowing cereal column existing below the heating zone.

The thickness adjusting of the parallel, thin and sloping blades of flowing cereals is preformed by vertically lifting and lowering the assembly of the above-mentioned sloping planes joined by a common horizontal edge. This maneuver narrows or widens the spaces between these planes and the narrow rectangular slits emptying the microbins.

Below the heating zone is a storage zone containing a settled cereal mixing means for a more advanced homogenization and residence time equalization. This zone includes three groups of baffle plates, each group having two rows of baffle plates, one below the other. The baffle plates slope at 45°, those of an upper row in one direction, those of the corresponding lower row in the opposite direction. The disposition directions of the baffle plates alternate: each group has a direction perpendicular to that of the upper group. The baffle plate groups permit cereal flow in the shape of blades, which are mixed and redivided, in their continuous flowing motion.

At the lower part of the storage zone of the same apparatus, the means for equalizing the residence time and for fighting the suction effect due to the following cooler-drier, includes horizontal prisms of rhombic section, the axes of which section are horizontally and vertically disposed. In the first prisms row, the upper one, there are as many prisms as there are narrow outlet slits in the microbins, the prisms being mutually parallel; the following prism row, inserted into the spaces between the prisms of the preceding row, comprises the same number of prisms less one, and so on; the last row contains a single prism, which may be vertically lifted and lowered, alone or jointly with other prisms.

The prisms, together with the two sloping walls at the lower part of the fast heating and storage apparatus, perform a division of the cereal flow, in parallel and sloping blades, which are mixed and redivided; the cereals leave the apparatus through a rectangular narrow slit, parallel to the microbin slits and also extending over the whole depth of the apparatus.

c. A prismatic cereal cooler-drier, connected by two sloping planes to the rectangular narrow slit at the bottom of the apparatus item (b). This apparatus comprises a mixing zone for sudden cooling and drying while the cereals are in continuous flow downwards. This zone is provided with several means for cereal layer division and mixing while bathed in the cooling air. The airflow is countercurrent to the flow of the cereals. The apparatus is also provided with several intermediate and indirect air heating means to bring the flowing air back to the relative humidity adequate for drying.

The means for repeated cereal layer division and mixing, bathed in the cooling air, includes firstly two internal planes, at the upper part of apparatus item (c). These planes are unperforated and parallel to the planes connecting the apparatus to the rectangular narrow slit at the bottom of the apparatus item (b). In the gaps formed between these internal and external sloping planes, the cereals flow downwardly in two settled layers, each layer having parallel faces. In this way the cereals reach the outermost reaches of the interior of the apparatus prismatic body where they fall onto two sloping and perforated planes, which are spaced from one another at the center interior of the apparatus prismatic body. The cereals flow on these two perforated planes from the outside towards the center and fall, at the center onto two other planes which are inclined downwards and outwards and perforated, and which share a common central edge. The cereals flow along these two other planes from the center towards the outside. These alternating couples of perforated flowing planes are repeated, in the necessary number, down to bottom planes sloping towards inside and perforated, which close the cooler-drier and by which the latter is connected to a narrow slit, joining it with the following apparatus. Through these perforated bottom planes, as well as through all the several sloping and perforated planes, the air penetrates and circulates in the cooler-drier, in a flow counter to that of the cereals moving in layers along the various sloping planes. The air bathes the cereal grains, for cooling and drying them, and partially fluidizes them. The air utilized for drying-cooling, moisture loaded, is sucked into the apparatus and is evacuated to the open through a perforated pipe, at the lower part of the cooling-drying zone.

The cooling-drying apparatus further contains, as means for moderate, intermediate and indirect air heating, horizontal radiators containing hot water or saturated steam of low pressure. These radiators are placed below the first alternating couple of sloping and perforated planes, along which the cereals flow.

Due to the uniform cereals heating, by steam jets directed at thin blades of flowing cereal, the process and the plan of the present invention may assure, without risks, the conditioning and thermal treatment temperatures necessary. The heating thermal shock, thus achieved, as well as that from the following air cooling, has been found efficient. This being the case, the milling propriety improvement, respectively that of the bread manufacturing qualities, reach the best known level.

There follows an example of an embodiment and the operation of a continuous conditioning or treatment plant for cereals for bread, especially wheat, according to the invention, also in connection with the accompanying figures, which represent:

1—1 a vertical section through the plant;

FIG. 2—a side view of the plant, for the direction M in FIG. 1.

The continuous plant, according to the invention, is composed, from top to bottom, of the following parts: a bin A, with a prismatically shaped main body $a$, of square horizontal section and a pyramid frustum shaped bottom $b$, the lateral faces of which have greater slopes than the wheat flow natural slope, which bottom ends at the square mouth $c$, for direct connection to the following apparatus.

The latter, apparatus B, is the fast heating and depositing prismatic apparatus, of square section and having at the upper side, an inflation $d$, and, on the outside, the thermal insulation $e$. The apparatus B has, at the upper part, the steam jets heating zone $B_1$. In this zone, one finds firstly, two shallow and long microbins 1. These bins partition the connection mouth section $c$. Their bottoms have two planes $g$ sloping, one towards the other, and an efflux mouth $h$ in the shape of a narrow rectangular slit, whose depth extends over the whole depth of the assembling mouth $c$. Below the mouths $h$ there are two groups of flowing planes 2, each consisting of two planes $i$, sloping in opposed directions, each at 45°, joined at a horizontal edge $f$, located below and in the center of the slits of mouths $h$. Below the planes $g$ are placed the low pressure saturated steam pipes 3, provided with nozzles, having steam jets $j$ which are spaced, transversely from the planes $g$. A second row of steam pipes having nozzles for the steam jets $k$ are mounted below the common edges $f$ of the sloping flowing planes 2. The sloping flowing planes 2 may be lifted and lowered vertically. These manipulations make tighter, respectively larger, the spaces between the planes and the rectangular narrow slits of mouths $h$ for draining the microbins 1.

In the depositing and mixing zone $B_2$ of the apparatus B, there are three baffle plate groups $5_1$ to $5_3$ placed at different levels. Each group consists of two rows of parallel baffle plates one row located one below the other. The baffle plates of an upper row each slope at 45°, in one direction, while those of the lower row slope at 45° in the opposite direction. The group $5_1$ is disposed parallel to the direction of the narrow slits of mouths $h$; the group $5_2$ is perpendicular to the direction of the narrow slits of mouths $h$; the group $5_3$ is again disposed parallel to the narrow slits of mouths $h$.

At the lower part of the storing and mixing zone $B_2$ are placed the means for equalizing the cereals resting time and for avoiding a suction effect due to the next apparatus. These means consist of two horizontal prisms $6_1$ having rhombic section with vertical and horizontal axes, in one row. These prisms are disposed parallel to the direction of the narrow slits of mouths $h$. In the next row and between prisms $6_1$ there is the same sort of prism $6_2$.

The prism $6_2$, alone or together with the prisms $6_1$, may be vertically lifted and lowered to increase or reduce the distance of its under faces from the wedge-shaped bottom, constituted by the sloping planes 1, to which is connected the narrow rectangular slit $m$, through which the apparatus is drained and which is parallel to the narrow slits of mouths $h$ and also extends over the whole depth of the apparatus B.

At the lower part of the narrow rectangular slit $m$ is connected the cereal cooler-drier C, which constitutes a fast cooling and drying, mixing zone. The apparatus C is of prismatic shape, with a rectangular horizontal section, having, relative to apparatus B, a greater width but an equal depth. The cooler-drier C apparatus C. connected, at its upper end, via two sloping planes $n$, to the 1, rectangular slit $m$. At its lower end, it is connected via the perforated sheet planes $o$, to the narrow rectangular flowing slit $p$ and to the metering device D. Device D has a blade rotor, which permits the draining through the narrow rectangular slit $r$. Both slits $r$ and $p$ are parallel to the narrow slits of mouths $h$.

A means for cereal division into thin layers and for mixing in apparatus C consist firstly of the inner, nonperforated planes 7, which are parallel to the apparatus connection planes $n$, joined by the common edge $s$ and extended vertically downwards from the beginning of the vertical portion of apparatus C. The same means comprises, in the prismatic body, two sloping and perforated planes $8_1$, which start from the outside of the body and are centrally separated from one another. Situated below planes $8_1$ are two perforated planes $8_2$, sloping downwardly towards the outside of the body. These planes $8_2$ have a common edge $t$ and are spaced from the sides of the body. The sloping and perforated planes $8_3$ and $8_4$ which follow are duplicates of planes $8_1$ and $8_2$ respectively.

Below the edge $s$ of the inner sloping planes 7 there is the suction perforated pipe 9, which exhausts wet air which has served for cooling-drying.

Inside the prismatic body of the cooler-drier C, below the sloping and perforated planes $8_1$ and $8_2$, there are the horizontal radiator groups $10_1$ and $10_2$ containing low pressure, saturated steam.

The plant described is continuously fed with bread cereals, entering the bin A, in the prismatic body of which a cereal level is automatically maintained between two given limits. The cereals continuously flow, through the microbins 1, further through their narrow rectangular slits $h$, thence symmetrically over the flowing planes 2. In the heating zone $B_1$, the relatively settled and sloping thin blades, flowing over the planes 2, are subjected to the steam jets $j$, escaping through the nozzles of pipes 3. The cereals absorb the steam, are wetted and heated at the surface. The cereals leaving planes 2 add themselves to the settling cereal mass, existing in the storing and mixing zone $B_2$. A somewhat free surface $v$ is maintained beneath the planes 2. The flowing cereal blade thickness, on the inclined flowing planes 2, may be adjusted by vertically lifting and lowering the joined sloping planes 2 relatively to the narrow rectangular slits of mouths $h$. If a supplementary cereal heating and moistening is necessary, this is effected by means of the steam jets $k$ in the second row. These latter jets act on the somewhat horizontal surface $v$ and extend their effect through a layer of restricted thickness.

Below the surface $v$, the storing and mixing zone $B_2$ of the apparatus B down to the slit $m$ is maintained full of cereals, settling under their own weight in a slow flowing movement. While the depositing in the zone $B_2$, the cereal is mixed, successively divided into parallel blades, by means of the upper baffle blades of the baffle blade group $5_1$, in order to be mixed and redivided in other parallel blades by the lower range of baffle blades. This division and mixing is repeated by the lower baffle plate groups $5_2$ and $5_3$, every time in a direction rotated by 90°, a fact which achieves a better cereal homogenizing, from the point of view of their conditioning or treating. The thermal insulation $e$ maintains the heat supplied in the heating zone $B_1$.

In their further flow the cereals come upon, at the lower part of the storage zone $B_2$, the horizontal prisms $6_1$ of the first row, then the horizontal prism $6_2$, in the following row, which again divide the cereal flow into parallel blades, which finally are mixed again, thence to be discharged through the rectangular slit $m$. Thus the unequal flowing of cereal is avoided and the grain residence time in the apparatus is equalized. The suction effect on the steam in zone $B_1$, due to the lower working pressure in apparatus C, is also obviated.

The settling blade of cereal, which passes through the slit $m$, into the cooler-drier C, is divided into two blades, which flow along the sloping planes 7 and their vertical extensions. The cereals then successively flow over the perforated planes $8_1$ sloping towards the inside, are mixed, redivided, and then flow along the planes $8_2$ sloping towards the outside and so on, until they reach the sloping and perforated planes $o$, which direct them to the outlet of the installation through slit $p$ and the metering device D.

In their continuous flowing and mixing motion, from top to bottom, inside the apparatus C, along the sloping planes $8_1$ to $8_4$ and $o$, in the shape of layers, the cereals are bathed in the cool air, which penetrates and circulates inside the apparatus, through the perforations of these planes, in counterflow to the moisture content adequate for milling, efficiently conditioned or thermally treated.

In the described plant, a wheat quantity of good quality, with a glutenic index of 29.44, has been subjected to conditioning, by heating up to the temperature of 55° C. As a result of this conditioning, the wheat milling properties have been improved; this has caused an increase in the white meal extraction by 2.25 percent, in prejudice of that of the whole meal, which has diminished by 2.15 percent; the ash content is also reduced. An increase of the actual hydration capacity of the meal has been ascertained along with a decrease in of the meal specific consumption (0.2, respective 1.4 percent). More complete results regarding the unconditioned and conditioned wheat may be found in the Tables Nos. 1 and 2, batch I.

In the same plant described, a wheat quantity of bad quality, glutenic index 7.6, has been subjected to thermal treatment, by heating up to the temperature of 73° C. As a result of this treatment, the glutenic index has increased to 23.7; the wheat milling properties have been improved; this has caused an increase of the white meal extraction by 1.92 percent, in prejudice of that of the whole meal, which has diminished by 2.50 percent; the ash content is reduced. An increase of the meal real hydration capacity has been noticed, as well as important decreases of the meal specific consumption figures (1.0, respective 0.9 percent). More complete results regarding the untreated and thermally treated wheat and meal are given in Tables Nos. 1 and 2, batch II.

The wheat of the above batches I and II, which has not been conditioned, respectively thermally treated, has been washed; the wheat which has been conditioned, respectively thermally treated, has not been washed. By preliminary washing, the ashes index further decreases and the white meal extraction surpluses improve.

By applying the continuous process and installation according

TABLE NO. 1.—COMPARATIVE RESULTS OBTAINED BY CONDITIONING AND THERMAL TREATMENT OF TWO BATCHES OF WHEAT, REGARDING THE WHEAT AND MEALS

| Batch | Wheat sort | Wheat quality indices before milling | | White meal quality indices, extraction type 32% | | | Whole meal quality indices, extraction type 49% | | |
|---|---|---|---|---|---|---|---|---|---|
| | | Hectolitric weight, kg./hl. | Glutenic index | Glutenic index | Extraction surplus, percent | Ashes, percent | Glutenic index | Extraction surplus, percent | Ashes, percent |
| I | Unconditioned | 80.0 | 29.44 | 37.4 | | 0.480 | 23.5 | 2.15 | 1.28 |
| | Conditioned | 80.0 | 29 20 | 37 | 2.25 | 0.470 | 27.0 | | 1.25 |
| II | Thermally untreated | 79.9 | 7.6 | 8.12 | | 0.486 | 0.7 | 2.50 | 1.31 |
| | Thermally treated | 79.9 | 23.7 | 29.1 | 1.92 | 0.380 | 22.7 | | 1.30 |

TABLE NO. 2.—COMPARATIVE RESULTS OBTAINED BY CONDITIONING AND THERMAL TREATMENT OF TWO LOTS OF WHEAT REGARDING THE MEAL BREAD MANUFACTURE QUALITIES

| Batch | Wheat sort | White meal quality indices, extraction type 32% | | | | Whole meal quality indices, extraction type 49% | | | |
|---|---|---|---|---|---|---|---|---|---|
| | | Real hydration capacity, percent | Bread moisture contents, percent | Specific consumption cold, percent | Meal savings, percent | Real hydration capacity, percent | Bread moisture contents, percent | Specific consumption cold, percent | Meal savings, percent |
| I | Unconditioned | 57.6 | 44.53 | 72.6 | | 53.31 | 42.9 | 73.7 | |
| | Conditioned | 58.2 | 44.35 | 72.4 | 0.2 | 57.2 | 44.4 | 72.2 | 1.4 |
| II | Thermally untreated | 54.2 | 42.27 | 74.5 | | 54.0 | 42.32 | 74.2 | |
| | Thermally treated | 56.4 | 42.34 | 73.5 | 1.0 | 54.8 | 42.6 | 73.3 | 0.9 | cereals. This maintains the cereals in a partially fluidized state. For that reason, the slopes of these planes are smaller than the natural cereal flowing slope.

In its circulation through the cereals, the air cools them down, without considerably warming up itself, because it evaporates water from the cereals and therefore quickly charges itself with the supplementary moisture coming from the steam treatment of zone $B_1$. To bring the air back to its initial moisture content, the air is heated by the radiators $10_2$ and then $10_1$. The moistened air, which has cooled and dried the cereals, is then exhausted through pipe 9.

The cereals discharged from the plant of the present invention are thus quickly cooled down and brought back to the to the invention, in order to achieve the conditioning or the rapid thermal treatment of bread cereals and especially of wheat, the following advantages are obtained:

the milling properties, respectively the bread manufacture qualities, are raised to the best known level;

the operation is preformed at atmospheric pressure, without previous moistening, by heating, and simultaneous moistening by steam jets, the cereals being stored and mixed, in a settled state and small volume, with reduced humidity increase, without any degradation risks, thence to be cooled and dried in loose layers, with cool air, while reusing for drying the whole heating-moistening heat;

easy operation is permitted, with simple and efficient automation possibilities;

there is used a simple and easily constructed plant, of reduced dimensions and high productivity, made of iron sheet, without moving pieces, developed in height, which occupies a reduced area and is able to be grouped in batteries, may be easily inserted in the continuous flow of the meal mills and which works with reduced running and investment expenses.

What we claim for is:

1. Continuous plant for fast conditioning or for thermal treatment of bread cereals, especially wheat, comprising from top to bottom, in combination, the following:
   a. a prismatic bin, with a pyramid frustum-shaped bottom, wherein a cereal mass may be maintained at an adjustable level, between two limits, from which mass the plant is fed;
   b. a cereal fast heating and storage prismatic apparatus, having a connection mouth open to said bin and thermal insulation on its outside, containing below said mouth a heating zone having nozzle means for producing steam jets and means for dividing the relatively settled cereals flow into parallel, thin and sloping blades, of adjustable thickness, the blades thence to fall into a somewhat horizontal settled cereals layer, the nozzle means being spaced from said dividing means, the heating zone being followed by a storage zone having means for maintaining said somewhat horizontal settled cereals layer, for mixing, for homogenizing, for grain residence time equalization and for avoidance of the suction effect due to the following apparatus;
   c. a prismatic cereals cooler-drier, connected by a means for forming a narrow slit to the apparatus of paragraph (b), which comprises a mixing zone for sudden cooling and drying of cereals in continuous flow, from top to bottom, the mixing zone being provided with reiterated means for dividing the cereals in layers and for their mixing, while bathed in cooling air, and means for circulating such cooling air in countercurrent flow to that of the cereals, the cooler-drier being also equipped with means for intermediate and indirect air heating for bringing back the relative humidity adequate for drying; and
   d. an adjustable volumetric metering means for metering the settled, cooled and dried, cereals flow, received from the cooler-drier of paragraph (c).

2. A continuous plant, according to claim 1, characterized in that the means for dividing, as set forth in paragraph (b) of claim 10, includes: a plurality of microbin means for separating said connection mouth into a plurality of small bins, the microbin means being prismatic and each having a bottom composed of two planes sloping one towards the other and spaced at their lowest points for forming a narrow rectangular slit, the depth of which slit extends over the whole depth of said connection mouth; and, for each microbin means, two sloping planes, sloping outwardly and downwardly in opposite directions and joined at a horizontal common edge, each common edge and its planes being centered symmetrically below one of the microbin slits for equally dividing flow between two relatively settled blades;

further characterized in that the nozzle means, as set forth in paragraph (b) of claim 1, includes steam-conducting pipes and nozzles mounted on said pipes, the nozzles and pipes being spaced from the paths of blades formed by the two sloping planes below the microbin means, the nozzles also being spaced from the somewhat horizontal settled cereals layer, whereby the nozzles and pipes do not touch the cereals, certain of said nozzles being aimed to direct steam jets onto said blades, certain of said nozzles being aimed to direct steam jets onto the somewhat horizontal settled layer.

3. Continuous plant, according to claim 2, characterized in that, in the fast heating and storage apparatus, in the heating zone, thickness adjustment of the parallel thin and sloping blades of flowing cereals, is performable by way of means for permitting vertical lifting and lowering of said two sloping planes beneath the microbin means.

4. Continuous plant, according to claim 2, characterized in that, in the apparatus for fast heating and storage (b), at the lower part of the storage zone, the means for the residence time equalization and for avoiding the suction effect due to the cooler-drier comprises horizontal prisms of rhombic section with vertical and horizontal axes, there being a first row of such prisms in a number equal to that of the narrow rectangular slits, to which they are parallel, a following prism row, inserted between the preceding, the number of prisms in this following row being less by one than the number in the preceding row, and a last row containing a single prism, which may be vertically lifted and lowered, the bottom of the apparatus (b) comprising sloping walls spaced from and parallel to the sides of said single prism, whereby a cereal flow division into parallel and sloping blades of cereals, is effected which blades are mixed and redivided, the lower edges of said sloping walls being spaced and parallel whereby the cereals leave the apparatus through a narrow rectangular slit, parallel to the narrow rectangular slits of said heating zone and extending over the entire depth of the apparatus (b).

5. Continuous plant, according to claim 1, characterized in that, in the fast heating and storage apparatus, in the storage zone, the means for maintaining mixing, homogenizing, and for residence time equalization includes three groups of baffle plates, each of two rows, one row below the other, the plates of one row sloping at 45° in one direction, the plates of the other row sloping at 45° in the opposite direction, each group having a direction perpendicular to its neighbors, whereby said baffle plates permit the cereals to flow in blades which are mixed and redivided, in their continuous flowing motion.

6. Continuous plant, according to claim 1, characterized in that the cereal cooler-drier (c) is prismatically shaped, connected above by two sloping planes (n), to the narrow rectangular slit on the bottom of apparatus (b) and, below, by two perforated sloping planes to a narrow rectangular outlet slit and to the metering means (d), the reiterated means comprising two internal nonperforated planes (7), parallel to the apparatus connecting planes (n), along which the cereals flow, in two settled layers, with parallel faces, the reiterated means further comprising perforated sloping planes ($8_1$), at their lower central edges extending to the prismatic walls below the planes (7) and spaced from one another for the flowing from the outside of the cooler-drier towards the middle, and below planes ($8_1$) two perforated planes ($8_2$) sloping towards the outside and having a common central edge, whereby air may penetrate the perforated planes in the cooler-drier, in countercurrent flow to that of the cereals, while they flow in layers along the different inclined planes, whereby the grains are bathed for cooling and drying and are partially fluidized, the circulating means including a perforated pipe located in the upper part of the mixing zone.

7. Continuous plant, according to claim 6, characterized in that the means for air heating comprise horizontal radiators which may be supplied with hot water or low pressure saturated steam, said radiators being located below the sloping planes ($8_1$ and $8_2$).

* * * * *